United States Patent [19]

Minnick

[11] 4,158,602

[45] Jun. 19, 1979

[54] METHOD AND APPARATUS FOR CONTROLLING THE NEUTRON FLUX IN NUCLEAR REACTORS

[75] Inventor: Lawrence E. Minnick, Los Altos Hills, Calif.

[73] Assignee: Electric Power Research Institute, Inc., Palo Alto, Calif.

[21] Appl. No.: 762,972

[22] Filed: Jan. 27, 1977

[51] Int. Cl.$^2$ ............................................. G21C 7/08
[52] U.S. Cl. ............................... 176/36 R; 176/36 C
[58] Field of Search ..................................... 176/36, 86

[56] References Cited

U.S. PATENT DOCUMENTS

| T942,002 | 1/1976 | Roman et al. | 176/36 R |
|---|---|---|---|
| 2,904,487 | 9/1959 | Dickson | 176/36 R |
| 3,010,887 | 10/1961 | Baumgarten et al. | 176/36 R |
| 3,031,397 | 4/1962 | Fortescue et al. | 176/36 R |
| 3,088,902 | 5/1963 | Kumpf | 176/36 R |
| 3,138,536 | 6/1964 | Murray et al. | 176/36 R |
| 3,154,472 | 10/1964 | Shannon | 176/36 R |
| 3,232,842 | 2/1966 | Costes et al. | 176/36 R |
| 3,278,385 | 10/1966 | Duframe | 176/36 R |
| 3,432,387 | 4/1969 | Jonsson | 176/36 R |
| 3,462,345 | 8/1969 | Jabsen | 176/36 R |
| 3,627,632 | 12/1971 | Acher et al. | 176/36 R |

FOREIGN PATENT DOCUMENTS 1066014  4/1967  United Kingdom ................... 176/36 R

OTHER PUBLICATIONS

ANS Transactions, vol. 19 (10/74), pp. 275–276.
"Hydraulically Supported Absorber Ball Development and Test Program", Rockwell International, 10/26/75.

Primary Examiner—Samuel W. Engle
Assistant Examiner—S. A. Cangialosi
Attorney, Agent, or Firm—Flehr, Hohbach, Test, Albritton & Herbert

[57] ABSTRACT

A control rod assembly in a nuclear reactor that automatically scrams the reactor when a loss of coolant flow occurs and that can also control the level of neutron flux in the reactor. The control rod assembly includes a separator plate having an orifice through which the reactor coolant flows and a sealing surface around the orifice. The control rod in the assembly has a complementary sealing surface. When the control rod and separator plate are brought into contact, the differential pressure across the separator plate caused by the flow of the primary coolant through the reactor core retains the two sealing surfaces together. If the flow of coolant stops or the differential pressure across the separator plate decreases for any reason, the control rod drops by gravity and the reactor is scrammed. The control rod is also automatically dropped as a result of the lateral vibration of an earthquake or by the downward motion of the rod drive shaft, either of which will open the sealing surfaces and reduce the sealing pressure.

22 Claims, 12 Drawing Figures

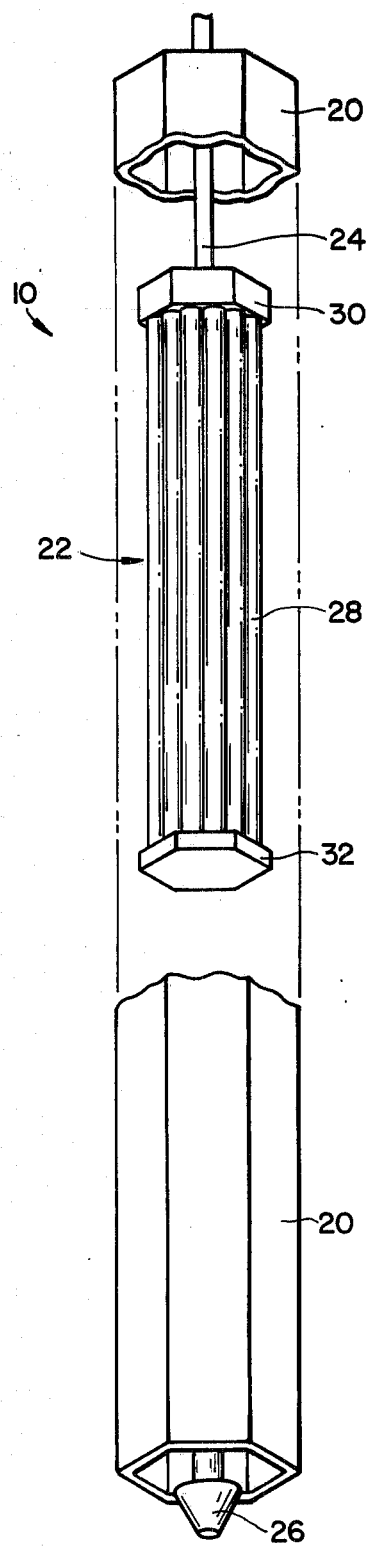
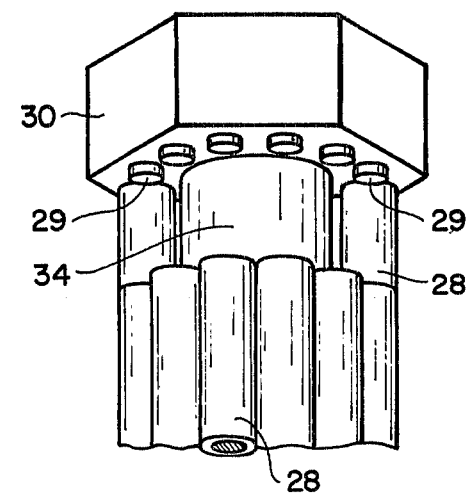
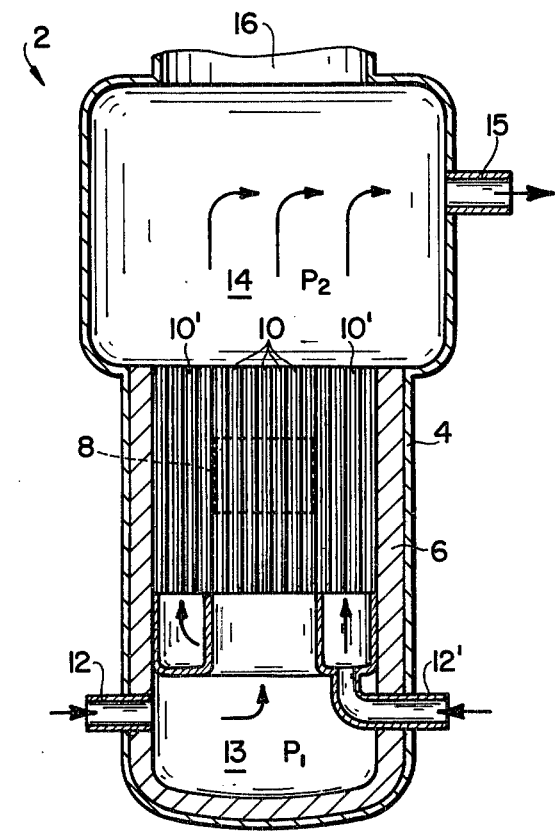

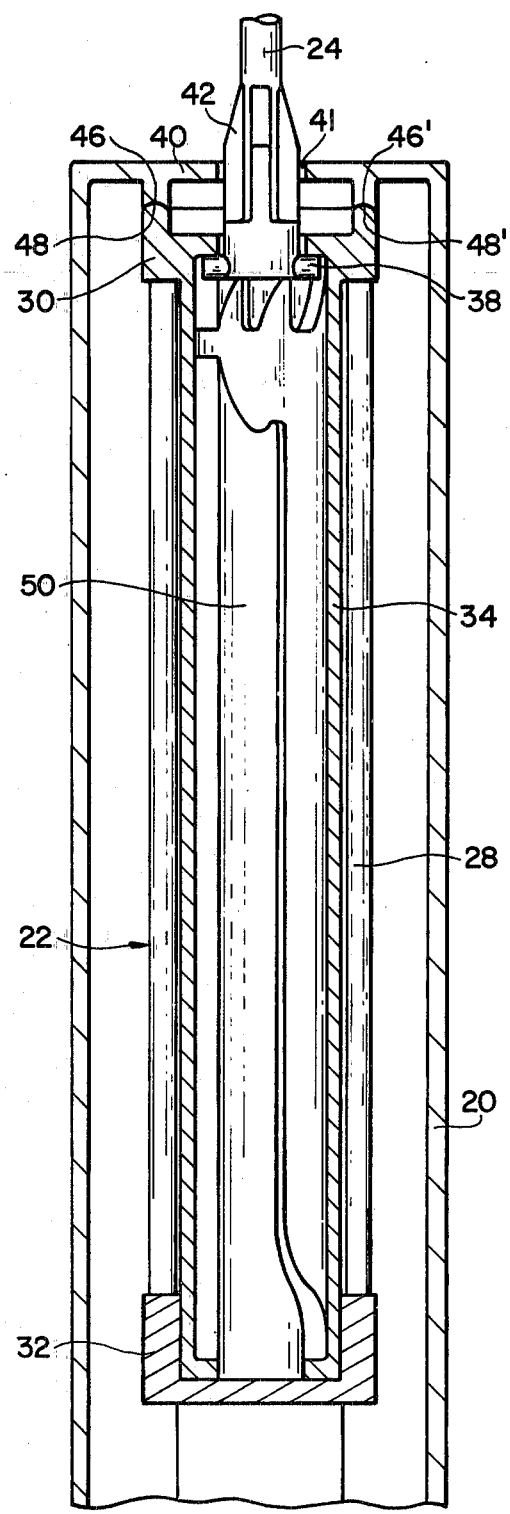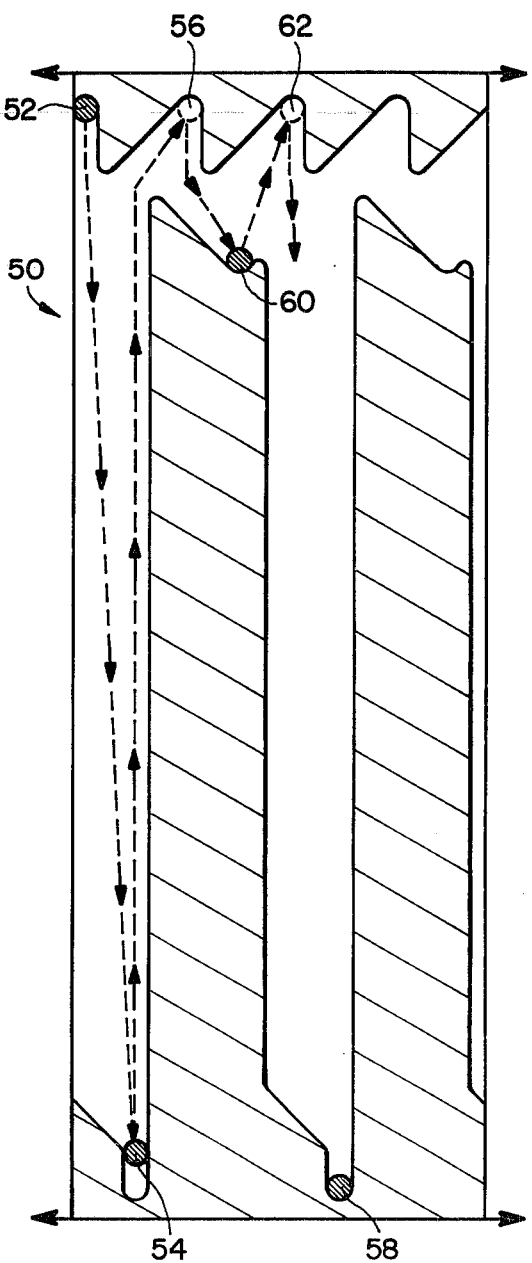
FIG_4  FIG_5

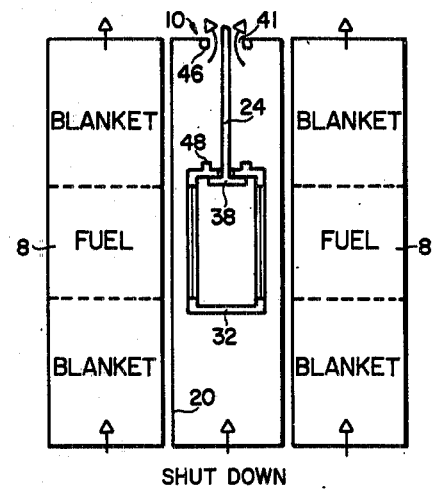
SHUT DOWN
FIG_6
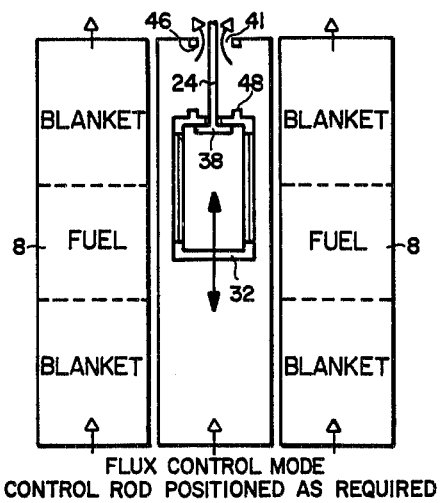
FLUX CONTROL MODE
CONTROL ROD POSITIONED AS REQUIRED
FIG_7
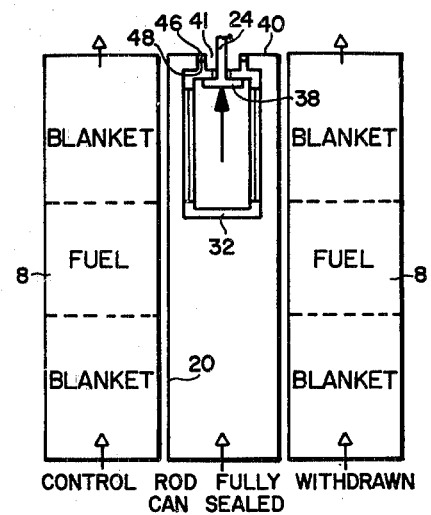
CONTROL ROD FULLY WITHDRAWN
CAN SEALED
FIG_8
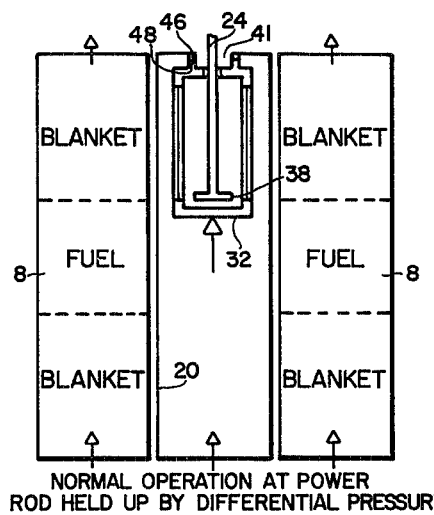
NORMAL OPERATION AT POWER
ROD HELD UP BY DIFFERENTIAL PRESSURE
FIG_9
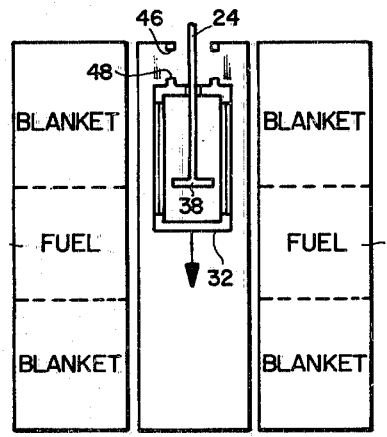
LOSS OF FLOW SCRAM
FIG_10
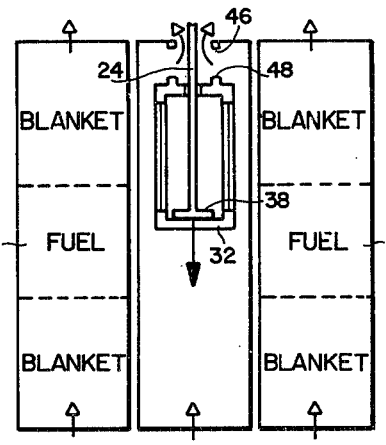
NORMAL SCRAM
FIG_11
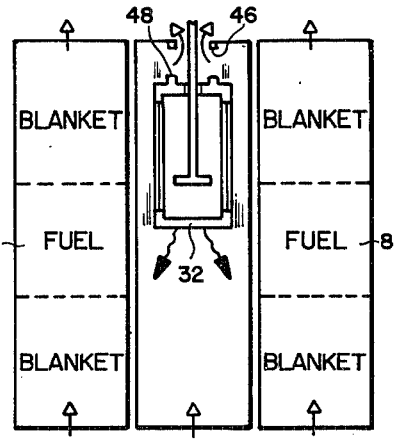
EARTHQUAKE SCRAM
FIG_12

METHOD AND APPARATUS FOR CONTROLLING THE NEUTRON FLUX IN NUCLEAR REACTORS

BACKGROUND OF THE INVENTION

1. Field of the Invention

This invention generally relates to control rod assemblies for nuclear reactors and, more particularly, to the operative connections between control rods and control rod drive mechanisms.

2. Description of the Prior Art

One of the most serious accidents that can occur to a nuclear power plant is a loss of the flow of coolant followed by the failure of the control system to accomplish a rapid shutdown of the reactor. A loss of coolant flow can occur from either the rupture of piping or the stoppage of one or more of the coolant circulating pumps. This type of accident is especially serious because the heat generated in the reactor cannot be carried off. If the reactor continues to generate heat, then tremendous pressures are built up in the coolant system. In addition, this heat generation, if it is not terminated by a scram, could melt down the majority of the core of the reactor.

In the reactors using liquid sodium for primary coolant, there is a special problem caused by a partial or total loss of sodium flow if reactor scram does not follow promptly. In the present design of liquid metal fast breeder reactors there is a gain in reactivity called a positive sodium void coefficient that occurs when sodium flow is interrupted. The sodium temperature may increase to its boiling point, whereupon "voids" of sodium vapor are formed, resulting in increased reactivity, power, more boiling, and the possibility of serious consequences. This gain in reactivity occurs because although the neutron absorption effect of sodium is small, it is not zero. Any loss of sodium from the core causes a shift in the neutron absorption spectrum and increases the number of neutrons. This shift, in turn, increases the probability of neutron capture by the fissionable atoms in the fuel.

Many organizations, government agencies, and corporations have studied the problem of minimizing the probability of the loss of low accident. A considerable design effort has been expended over a priod of many years in order to provide maximum assurance to both the public and the various reactor licensing agencies that this accident can be avoided.

Heretofore, the most reliable and simplest system that has been proposed contemplates hydraulically supporting a plurality of tantalum absorber balls in a column above the reactor core by the flow of primary coolant. In the event coolant flow is reduced, these balls which have a large neutron absorption coefficient fall into the high flux region of the core and quickly shut down the reactor.

Although the use of hydraulically supported, absorber balls provides a self-actuated and reliable reactor shut-down system, there are many inherent limitations with this system. For example, the absorber balls are hydraulically supported by the flow of primary coolant in a position substantially above the high flux region of the core. In this position the balls cannot be maneuvered to regulate the amount of neutron flux during normal operations. Secondly, the absorber balls are only controlled by the flow of primary coolant through the column. Therefore, the balls add reactivity to the system whenever the main coolant pumps are started and primary coolant flow is commenced. Further, the hydraulically supported absorber balls only shut down the reactor when the flow of primary coolant decreases. The balls cannot be commanded to scram a reactor by either the reactor operator or one of the other reactor safety systems. Finally, considerable testing will be necessary to demonstrate the exact response of the tantalum balls under actual reactor conditions of flow and wear.

SUMMARY OF THE INVENTION

It is an object of the present invention to provide a novel method and apparatus that overcomes the limitations and disadvantages of the prior art.

A further object of the present invention is to develop a reactor shut-down system that can provide maximum assurance to both the public and the various reactor licensing agencies that the system will in fact operate during any emergency situation.

Another object of the present invention is to provide a system for scramming a reactor that is directly initiated by a loss of coolant flow and a self-actuated system that will operate without electrical circuits, sensors, or rod drive mechanisms.

An additional object of the present invention is to develop a self-actuated, loss of flow scramming system that can also be commanded through a conventional rod drive mechanism to initiate a scram.

Still another object of the present invention is to provide a self-actuated, loss of flow scramming system that can be used to control the level of neutron flux during normal power operation, especially normal reactor start-ups and shut-downs.

A further object of the present invention is to provide a system that will reliably scram a reactor during a severe earthquake.

The foregoing and other objects are achieved by a control rod assembly that includes a separator plate having an orifice through which primary coolant flow and across which a differential pressure may be developed. Around the orifice is located a sealing surface that can be engaged by a control rod. The control rod can be independently moved with respect to the core of the reactor and can also be brought up and into engagement with the separator plate. The differential pressure across the separator plate and the control rod seal retains the sealing surfaces of the control rod and the separator plate together.

In operation, normal flow through the reactor develops sufficient differential pressure across the separator plate and the control rod seal to retain the control rod against the separator plate and above the high neutron flux region of the core. When the flow of primary coolant is reduced or the differential pressure across the separator plate decreases sufficiently, the control rod falls by gravity and the reactor is scrammed. The reactor can also be scrammed on command by the downward motion of the rod drive shaft which causes the sealing surfaces to separate. During a severe earthquake the reactor will be scrammed because a lateral motion of the control rod with respect to the separator plate brought about by different inertia of the separator plate and the control rod will cause the sealing surfaces to separate.

Additional objects and features of the invention will appear from the following description in which the preferred embodiment has been set forth in conjunction with the accompanying drawings.

BRIEF DESCRIPTION OF THE DRAWINGS

FIG. 1 is a diagrammatic, side elevational view, in cross section, of a conventional liquid metal fast breeder reactor.

FIG. 2 is a perspective view, partially cut away, of a control rod assembly for the reactor of FIG. 1 according to the present invention.

FIG. 3 is an exploded perspective view of the upper portion of the control rod of FIG. 2.

FIG. 4 is a side elevational view, partially cut away and in cross section, of the control rod assembly of FIG. 2.

FIG. 5 is a projection of the surface of the cam located on the inner surface of the side wall of the control rod assembly of FIG. 4.

FIGS. 6–12 are schematic diagrams illustrating the operation and features of the present invention.

DESCRIPTION OF THE PREFERRED EMBODIMENT

FIG. 1 illustrates the arrangement of components in a conventional liquid metal fast breeder reactor. The reactor includes a vessel 4 that contains a thermal shield 6, a plurality of fuel carrying subassemblies 10 and the primary coolant flowing through the reactor. The reactor uses partially enriched uranium (U-235) or plutonium (Pu-239) for fuel and the primary coolant is typically sodium at atmospheric pressure. The fuel is located in the core indicated by reference numeral 8 and is carried by those subassemblies 10 that pass through that area. Surrounding the core is a blanket of depleted uranium.

The liquid sodium is pumped into the reactor 4, FIG. 1, through the inlet nozzles 12, 12'. The sodium entering through the inlet nozzle 12 passes into a lower plenum 13 and flows through the subassemblies 10 that penetrate the core area 8. The sodium entering through inlet nozzle 12' passes through the radial blanket subassemblies 10'. All of the subassemblies 10, 10' discharge the sodium into an upper plenum 14 where it thereafter flows out of the reactor through an outlet nozzle 15. The liquid sodium is maintained at essentially atmospheric pressure in the reactor by a blanket of inert gas 16 located in the upper portion of the reactor vessel.

Typically, ten percent of the subassemblies in a liquid metal fast breeder reactor contain control rods and the other subassemblies contain either fuel or radial blanket elements. FIG. 2 illustrates one of the subassemblies that contains a control rod 22. This subassembly also includes a can 20 of hexagonal shape and a control rod drive shaft 24 that raises and lowers the control rod 22 with respect to the core 8. The rod drive shaft is connected to a rod drive mechanism (not shown) of conventional construction. The can is typically fabricated from stainless steel sheet stock and forms a conduit through which the sodium flows. The subassembly is terminated by an alignment stud 26 that maintains the lateral relationship of the subassembly with respect to a horizontal support plate (not shown).

Referring to FIGS. 2–4, the control rod 22 is generally hexagonal in cross section and is freely movable within the can 20. The control rod consists of a plurality of elongate circular poison containing rods 28. Each rod is fabricated from boron carbide ($B_4C$) and is rigidly mounted by pins 29 between an upper and a lower support member 30, 32. The support members are rigidly mounted with respect to each other by a vertical support tube 34 that is surrounded by the poison rods 29. The upper support member 30, FIG. 4, has an upwardly projecting ring that forms a sealing surface 48 for the control rod as described in detail below.

Referring to FIG. 4, the subassembly can 20 includes a separator plate 40 that forms the top of the subassembly. The separator plate contains an orifice 41 through which the control rod drive shaft 24 penetrates. To maintain alignment between the control rod 22 and the inside of the can 20, the drive shaft 24 has a plurality of centering vanes 42 that aid in seating the control rod 22 against the separator plate 40. The separator plate 40 further includes a downwardly projecting ring that forms a sealing surface 46. This sealing surface is engaged by a complementary sealing surface 48 located on the upper support member 30. When the two sealing surfaces 46, 48 are brought into contact as illustrated in FIG. 4, a fluid-tight seal is made.

The complementary sealing surfaces are slightly rounded in order to prevent lateral displacement of the control rod with respect to the separator plate due to ordinary vibration. Such lateral displacement could break the seal and cause the control rod to drop as described below.

The control rod 22, FIG. 4, is raised and lowered within the can 20 by a plurality of laterally disposed lifting bosses 38. The bosses are circular in cross section and engage a cam located on the inner surface of the side wall of the vertical support tube 34. FIG. 5 is an illustration of this cam and is a projection of the inner cylindrical surface of the support tube. The motion of the lifting bosses along the cam is described in detail below.

OPERATION

When sodium is being pumped through the reactor of FIG. 1, it enters the vessel 4 through one of the inlet nozzles 12, 12'. The sodium entering through nozzle 12 passes into a lower plenum 13 and flows through the subassemblies 10 containing fuel. The sodium entering through nozzle 12' flows through the subassemblies 10' containing radial blanket material. All of the subassemblies 10, 10' discharge into the upper plenum 14 and from there the sodium flows out of the reactor through the exit nozzle 15. The flow of sodium through the subassemblies causes a drop in pressure and in FIG. 1 the pressure P1 in the lower plenum 13 is substantially larger than the pressure P2 in the upper plenum 14. In a conventional liquid metal fast breeder reactor the differential pressure P1/P2 is typically about 100 PSI.

The sodium that flows through the subassembly 10 containing the control rod 22, FIG. 2, enters the can 20 around the alignment stud 26. The flow of directed by the can, around the control rod and out through the orifice 41, FIG. 4. Orifice 41 leads directly to the upper plenum 14. If the control rod is positioned against the separator plate 40, a fluid-tight seal is made between the sealing surfaces 46, 48 and the differential pressure P1/P2 across the subassemblies is sufficient to retain the control rod in place.

FIGS. 6–12 are schematic diagrams illustrating the operation of the preferred embodiment. Each figure depicts three adjacent subassemblies that pass through the core area 8, FIG. 1. The two outer subassemblies contain the fuel elements 8 and the inner subassembly houses the control rod 22. In each of the outer subassemblies the blanket areas are those areas that are located above and below the core 8 in FIG. 1. In all three subassemblies the primary coolant passes from the lower plenum 13, FIG. 1, into the bottom of the respective subassembly and flows out its top into the upper plenum 14. The presence of this flow is indicated by the arrows in the figures.

In particular, FIG. 6 illustrates the reactor in a shut-down condition. The control rod 22 is positioned opposite the fuel and in a position to absorb the maximum number of neutrons. The control rod is supported by the control rod drive shaft 24 and the lifting bosses 38. There is a flow of primary coolant through the control rod subassembly that enters at the bottom and exits through the orifice 41. The control rod is maintained in position by a rod drive mechanism (not shown) that stops any further downward motion of the rod drive shaft 24.

FIG. 7 diagrams the operation of the control rod 22 in regulating the power and the neutron flux in the reactor. The control rod 22 can be moved with respect to the fuel by raising and lowering the rod drive shaft 24. The position of the control rod with respect to the fuel controls the neutron flux and hence the power level. The control rod is supported in the same manner as FIG. 6 and coolant flows through the subassembly 10 and out the orifice 41.

In FIG. 8 the procedure for locking the control rod 22 against the separator plate 40 is shown. The control rod drive shaft 24 and the lifting bosses 38 raise the control rod until the sealing surfaces 46, 48 come into contact. These sealing surfaces form a fluid-tight boundry and there is no flow of coolant out of the orifice 41. The differential pressure P1/P2 across the separator plate caused by the flow of primary coolant through the reactor locks the control rod in the position shown in FIG. 8.

After the control rod 22 is locked against the separator plate 40, the control rod drive shaft 24 can be lowered to the position shown in FIG. 9. FIG. 9 illustrates the normal mode of operation of the preferred embodiment. The control rod subassembly can 20 is sealed and the flow of primary coolant through the orifice 41 is blocked. The differential pressure P1/P2 across the reactor maintains the sealing surfaces 46, 48 together. The control rod 22 thus remains up and out of the core.

FIGS. 10–12 depict three of the ways a scram can be initiated by the preferred embodiment. In FIG. 10 a loss of primary coolant flow through the reactor initiates the scram. Prior to the loss of flow the control rod 22 and the control rod drive shaft 24 were positioned as shown in FIG. 9. That is to say, the lifting bosses 38 were positioned so as not to restrict the downward motion of the control rod. When a loss of flow occurs, the differential pressure P1/P2 across the reactor automatically decreases. Since it is merely the pressure drop across the separator plate that is holding the control up, the control rod 22 falls by gravity as indicated in FIG. 10. Motion of the rod drive shaft is not required. The control rod falls until the lifting bosses 38 engage the upper support member 30, FIG. 4, of the control rod or until the control rod comes to rest on a conventional support. The lifting bosses are positioned and the control rod is dimensioned so that the control rod 22 comes to rest opposite the fuel as illustrated in FIG. 6. This self-actuated motion shuts down the reactor.

In FIG. 11 the scram is initiated when one of the reactor safety circuits or the reactor operator commands the rod drive mechanism (not shown) to scram the reactor. Upon receiving this command the rod drive mechanism releases the rod drive shaft 24 to drop by gravity or to descend under the force of a spring. This is the conventional mode of initiating a scram. When the control rod drive shaft 24 is either dropped or driven downward, the lifting bosses 38 engage the lower support member 32 of the control rod and the sealing surfaces 46, 48 are separated. This situation is illustrated in FIG. 11. When the sealing surfaces are separated, the differential pressure across the separator plate 40 is removed and the flow of coolant through the subassembly is restored. The control rod 22 then falls by gravity and comes to rest opposite the fuel as illustrated in FIG. 6. This type of scram can also be initiated by having the rod drive mechanism drive the rod drive shaft downward and thereby separate the sealing surfaces.

FIG. 12 illustrates how the reactor can be scrammed when subjected to a severe lateral acceleration or impulse such as experienced during an earthquake. Typically, a severe lateral acceleration will cause the control rod to rock over or move laterally and force the sealing surfaces 46, 48 to separate slightly. The flow of primary coolant out of the orifice 41 is then reestablished and the differential pressure removed. The inside diameter of the vertical support tube 34 and the rod drive shaft are dimensioned to permit this type of movement.

It should be noted that the preferred embodiment overcomes the problem of scramming the reactor during a severe earthquake when the upper reactor structure is displaced relative to the core. Such a displacement could prevent the control rod drive shaft from dropping and/or the rod drive mechanism from unlatching a conventional control rod and allowing it to drop. The preferred embodiment overcomes this problem because movement of the control rod drive shaft 24 is not required to initiate a scram. The scram is directly and inherently initiated by the action of the earthquake itself. Thus, the response of the control rod is an inherent reaction to the accident itself.

Referring to FIG. 5, a cam 50 may be employed in order to enhance flexibility of operation by providing a means of breaking the seal without reducing the flow of sodium. FIG. 5 is a projection of the inner surface of the vertical support tube 34 and illustrates the raised surface of the cam as one of the lifting bosses 38 is sequenced by the various surfaces of the cam. In particular, when the control rod drive shaft 34 supports the control rod 22 as shown in FIG. 6 or raises the control rod as illustrated in FIG. 7, the lifting boss 38 engages the cam at point 52. If the control rod is sealed against the separator plate and the drive shaft 24 is lowered to the position illustrated in FIG. 9, the lifting boss moves from point 52 to point 54. When the lifting boss is located at point 54, it is out of vertical engagement with the control rod. The differential pressure P1/P2 across the separator plate 40 is pushing the control rod against the separator plate 40 and maintaining the two sealing surfaces 46, 48, FIG. 4, together.

When a loss of flow accident occurs, the differential pressure P1/P2 decreases to effectively zero and the control rod drops by gravity, FIG. 10. The lifting boss in FIG. 5 remains at one elevation and the cam moves downward until the boss engages the cam at point 56. The vertical distance between points 54 and 56 is such that the control rod will come to rest opposite the fuel as shown in FIG. 6.

If a scram is commanded by the reactor or by one of the reactor safety systems, FIG. 4, the seal between the separator plate 40 and the control rod 22 is broken by the downward motion of the rod drive shaft 24. In FIG. 5 the lifting boss moves downward from position 54 to position 58 where it engages the cam.

The seal between the separator plate 40 and the control rod 22 can also be broken without flow interruptions and without having the control rod drop. That is to say, the mode of reactor control depicted in FIG. 9 can be shifted to that shown in FIG. 7. To effect this change, control rod drive shaft 24 can be lifted from point 54 to point 56 and then lowered to point 60. The motion of the boss is indicated by arrows in FIG. 5. When the lifting boss engages the cam surface at point 60, the seal can be broken by further downward motion of the control rod drive shaft. The control rod then drops and engages the boss at point 62 where it remains suspended by the rod drive shaft. The horizontal distance between points 60 and 62 is small and the motion of the control rod does not substantially affect the power level.

Besides the slightly rounded sealing surfaces 46, 48, FIG. 4 used in the preferred embodiment, the present invention also contemplates varying the contour of the sealing surfaces to satisfy other design criteria. Contours having both concave and convex cross sections, triangular cross sections and knife edges can be used. In addition, the contour can be excluded and a flat surface used for sealing.

It should also be noted that although the sealing surfaces 46, 48 in the preferred embodiment form a tight seal, the present invention does not required that the seal be fluid-tight. For example, the poison rods 28, FIG. 2, may require some flow of coolant in order to remove self-generated heat. Thus, a small aperture may be necessary in the control rod assembly 22 in order to allow coolant to reach the poison rods when the control rod is sealed against the separator plate, FIG. 9. Although this small aperture permits a flow of coolant to effectively flow across the separator plate, the aperture is dimensioned small enough that the differential pressure P1/P2 is not substantially reduced.

The present invention also contemplates providing a follower attached below the control rod 22, FIG. 2, to fill the void in the reactor caused by the withdrawal of the control rod. The follower has the same shape as the control rod and is raised into the core area 8, FIG. 1, as the control rod is pulled out of the core. The follower is contructed of the same material as the blanket, thereby increasing breeding game and the "worth" or effectiveness of the control rod. The addition of the follower does not affect the sealing between the surfaces 46, 48 because the differential pressure P1/P2 across the separator plate is sufficiently large to retain both the follower and the control rod against the separator plate.

Although the preferred embodiment is described in connection with a liquid metal fast breeder reactor, it is contemplated that this invention can be used on any comparable nuclear reactor.

Although the best mode contemplated for carrying out the present invention has been herein shown and described, it will be apparent that modification and variation may be made without departing from what is regarded to be the subject matter of the invention.

What is claimed is:

1. Apparatus for scramming a nuclear reactor having fuel elements and cooled by a flow of primary coolant, comprising:
    (a) reactor scramming means having a large neutron absorption and insertable into the high neutron flux region of the reactor;
    (b) means in the nuclear reactor for retaining the scram means away from the high neutron flux region of the reactor and in contact with a separator plate by restricting a portion of the flow of coolant through the reactor and developing a differential pressure across said separator plate, said separator plate being concurrently exposeable to the pressure of primary coolant flowing past the reactor fuel elements, said restricted flow and resulting differential pressure generating a force which maintains the scramming means away from the high neutron flux region when there is a flow in the reactor, said retaining means being adapted for releasing the scramming means from the separator plate independently from external actuation and in response to and substantially simultaneously with a reduction in the flow of coolant past the reactor fuel elements, thereby causing the scramming means to enter the high neutron flux region of the reactor; and
    (c) a supporting drive shaft and connector means connected between said drive shaft and the scramming means for manuvering the scramming means with respect to the high flux region of the core irrespective of coolant flow.

2. The apparatus of claim 1 wherein the supporting drive shaft can quickly insert on command the scramming means into the high flux region of the reactor so that the reactor is scrammed, said drive shaft means being actuatable independently from a reduction in the flow of coolant.

3. The apparatus of claim 1 wherein the supporting drive shaft can maneuver the scamming means with respect to the high flux region of the reactor so that the level of neutron flux is controllable during operation of the reactor.

4. In a nuclear reactor of the type cooled by a flow of coolant and having controls rods that are mounted for movement with respect to the fuel elements in the core, the improvement comprising:
    (a) a control rod in a control rod housing in a nuclear reactor, said control rod having a sealing surface and insertable into the high neutron flux region of the reactor independently from external actuation;
    (b) a supporting drive shaft connected to the control rod for moving the control rod with respect to the fuel elements; and
    (c) a stationary separator plate forming a top wall of the control rod housing and directly and concurrently exposed to the pressure of coolant flowing past the fuel elements in the nuclear reactor and having an orifice across which a differential pressure is developed by the flow of coolant through the reactor, said separator plate also having a sealing surface around said orifice which complements the sealing surface of the control rod, the sealing surfaces on the control rod nd separator plate can be retained together by the differential pressure developed by the coolant flow, said separator plate being positioned within the reactor so that a reduction in the flow of coolant past the fuel elements causes, in direct response thereto, a corresponding reduction of the differential pressure across the separator plate, release of the sealing surfaces on the control rod and the separator plate, and the entry of the control rod into the high neutron flux region of the reactor substantially simultaneously with the reduction in flow.

5. The apparatus of claim 4 wherein the supporting drive shaft can reduce the differential pressure across the separator plate on command, thereby causing the control rod to enter the high neutron flux region of the reactor.

6. The apparatus of claim 4 wherein the control rod is laterally displaceable with respect to the separator plate and the housing so that the sealing surfaces are separated and the differential pressure is reduced, thereby causing the control rod to enter the high neutron flux region of the reactor.

7. The apparatus of claim 4 wherein the supporting drive shaft can maneuver the control rod with respect to the high neutron flux region of the reactor so that the level of neutron flux is controllable during operation of the reactor.

8. The apparatus of claim 4 including means forming part of the sealing surfaces for centering the control rod with respect to the orifice in the separator plate.

9. In a nuclear reactor of the type cooled by a flow of coolant and having control rods that are mounted for movement with respect to the fuel elements in the core, the improvement comprising:
  (a) a control rod in a control rod housing in a nuclear reactor, said control rod having a sealing surface and being adapted for self-initiating a scram; and
  (b) a separator plate forming a top wall of the control rod housing and directly and concurrently exposed to the pressure of coolant flowing past the fuel elements in the nuclear reactor and having an orifice across which a differential pressure is developed by the flow of coolant through the reactor, said separator plate also having a sealing surface around said orifice which complements the sealing surface of the control rod, the sealing surfaces on the control rod and separator plate can be retained together by the differential pressure developed by the coolant flow, said separator plate being positioned within the reactor so that a reduction in the flow of coolant past the fuel elements causes, in direct response thereto, a corresponding reduction of the differential pressure across the separator plate, release of the sealing surfaces on the control rod and the separator plate, and the entry of the control rod into the high neutron flux region of the reactor substantially simultaneously with the reduction in flow;
  (c) a rod drive shaft operatively connected to the control rod for maneuvering the control rod sealing surface into sealing engagement with the sealing surface of the separator plate, said control rod being insertable into the high neutron flux region of the reactor independently from actuation by the rod drive shaft; and
  connecting means between the control rod and supporting rod drive shaft for manuvering said control rod with respect to the high neutron flux region of the reactor irrespective of the flow of coolant.

10. The apparatus of claim 9 wherein the rod drive shaft maneuvers the control rod with respect to the high neutron flux region of the reactor during operation.

11. The apparatus of claim 9 including means for connecting the rod drive shaft to the control rod so that the rod drive shaft can cause the control rod to be rapidly inserted into the high neutron flux region of the reactor independently from a reduction in the flow of coolant, thereby scramming the reactor.

12. The apparatus of claim 9 including means having lost motion for connecting the control rod to the rod drive shaft, said connecting means permitting the control rod to scram the reactor by entering the high neutron flux region of the reactor either independently of or directly actuated by the rod drive shaft.

13. The apparatus of claim 9 including means for connecting the rod drive shaft to the control rod so that the control rod is laterally displaceable with respect to the separator plate and the control rod housing and a reduction in the differential pressure is obtained, thereby causing the control rod to enter the high neutron flux region of the reactor.

14. A method for controlling the neutron flux in a nuclear reactor having fuel elements, comprising the steps of:
  (a) restricting a portion of the flow of coolant through the reactor;
  (b) developing a differential pressure across a separator plate within the reactor by the restricted flow;
  (c) exposing concurrently the separator plate to the pressure of primary coolant flowing past the fuel elements;
  (d) manuvering a control rod with a suporting drive shaft with respect to the fuel elements irrespective of coolant flow
  (e) retaining the control rod remote from the high neutron flux region of the reactor and in sealing contact with the separator plate by using the differential pressure developed by the restricted flow; and
  (f) reducing with differential pressure in order to free the control rod for movement with respect to the high flux region.

15. The method of claim 14 wherein the step of reducing the differential pressure occurs as a direct consequence of and substantially simultaneously with a reduction in the flow of coolant past the fuel elements in the reactor, thereby directly causing the insertion of the control rod into the high neutron flux region independent of external actuation.

16. The method of claim 14 wherein the step of reducing the differential pressure includes the step of actuating the reduction of differential pressure on command independently of a reduction in the flow of coolant so that the control rod is quickly inserted into the high neutron flux region of the reactor.

17. The method of claim 16 further including the step of maneuvering the control rod with respect to the high neutron flux region of the reactor in order to regulate the level of neutron flux during operation.

18. A method for controlling the neutron flux in a nuclear reactor having fuel elements, comprising the steps of:
  manuvering a control rod with a supporting drive shaft with respect to the fuel elements irrespective of coolant flow;
  (b) developing a differential pressure across a top wall of a control rod housing by exposing said top wall to the flow of primary coolant;

(c) exposing concurrently said top wall to the pressure of primary coolant flowing past the fuel elements;

(d) sealing the control rod against said top wall of the housing at a position remote from the high neutron flux region of the reactor by using said differential pressure caused by the flow of coolant through the reactor;

(e) unsealing the control rod from said top wall and thereby reducing the differential pressure; and (f) inserting the control rod after unsealing into the high neutron flux region of the reactor.

19. The method of claim 18 wherein the step of unsealing the control rod is performable independently from a reduction in coolant flow.

20. The method of claim 18 wherein the step of unsealing the control rod is accomplished by a lateral acceleration of the reactor.

21. The method of claim 20 wherein the step of unsealing by lateral acceleration is performed by an earthquake.

22. The method of claim 18 wherein the step of unsealing occurs without external actuation and substantially simultaneously with a reduction in the flow of coolant past the fuel elements in the reactor.

* * * * *